United States Patent [19]

De Leonibus et al.

[11] Patent Number: 4,959,117
[45] Date of Patent: Sep. 25, 1990

[54] APPARATUS FOR THE PRESSING OF LAMINATED GLASS/PLASTIC COMPOSITES

[75] Inventors: Vittore De Leonibus; Carmine Pascale, both of Vasto, Italy

[73] Assignee: Societa Italiana Vetro - SIV S.p.A., San Salvo, Italy

[21] Appl. No.: 264,881

[22] Filed: Oct. 31, 1988

[30] Foreign Application Priority Data

Nov. 5, 1987 [IT] Italy ............................... 48579 A/87

[51] Int. Cl.⁵ ..................... B30B 3/04; B30B 15/30; B30B 15/32
[52] U.S. Cl. ..................... 156/497; 29/125; 29/130; 100/155 G; 100/159; 100/160; 100/170; 100/173; 100/176; 156/538; 156/555; 156/580; 156/582
[58] Field of Search ............... 156/538, 539, 497, 555, 156/580, 582, 99, 109, 107, 104, 106; 100/93 RP, 155 R, 155 G, 159, 160, 170, 173, 176, 215, 218; 29/116.1, 125, 130

[56] References Cited

U.S. PATENT DOCUMENTS

| | | | |
|---|---|---|---|
| 3,054,344 | 9/1962 | Boicey et al. | 100/155 G |
| 3,250,211 | 5/1966 | Artama | 100/170 |
| 3,518,137 | 6/1970 | Hamilton | 156/104 |
| 4,625,637 | 12/1986 | Pav et al. | 100/170 |

Primary Examiner—Michael Wityshyn
Attorney, Agent, or Firm—Wenderoth, Lind & Ponack

[57] ABSTRACT

An apparatus for pressing laminated composites formed of two glass layers and one interposed thin plastic layer presses the glass/plastic composite while the glass/plastic composite is in a vertical position. A horizontal conveyor delivers the composite to the apparatus, and a tipping device places the composite in a vertical position. A suction cup unit, which is rotatably mounted on a supporting shaft, receives the composite from the tipping device. A movable carriage moves the supporting shaft, suction cup unit, and composite to a pair of pressing rolls. The pressing rolls receive the composite therebetween and press the composite layers together. Another rotatably mounted suction cup unit removes the composite from the pressing rolls and delivers the composite to another conveyer. The arrangement allows highly curved glass/plastic composites to be pressed with no risk of breaking the glass and without requiring manual intervention.

13 Claims, 7 Drawing Sheets

APPARATUS FOR THE PRESSING OF LAMINATED GLASS/PLASTIC COMPOSITES

BACKGROUND OF THE INVENTION

1. Field of the Invention

The present invention relates to the manufacture of laminated safety glass for automobile vehicles, and more particularly to an apparatus for the pressing of laminated glass/plastic composites of a highly curved shape, with side wings sharply bent in the direction of the concave side of the composite. The apparatus can be used in an automatically operated plant for the manufacture of laminated safety glass, and includes a device for the mechanical pressing of the glass/plastic composite and devices for moving the composite into and out of the press.

2. Description of the Prior Art

It is well known that laminated safety glass, particularly that used in windows of automobiles or other vehicles, comprises two curved sheets of glass with a layer of plastic interposed therebetween acting as an adhesive for the two sheets of glass.

In the following, the glass/plastic composite will be indicated by the term "sheet of glass".

In the manufacturing process of such a product, a step is provided for mechanically pressing together the sheets of glass and the plastic layer, in order to expel any air contained therebetween and to bond the edges. This prevents, in a successive autoclave treatment at a controlled temperature and pressure, any undesirable air penetration which could detach the glass and plastic layers from each other.

Apparatuses for carrying out this pressing step are well known in the prior art. Generally such apparatuses comprise a set of horizontally arranged pressing rolls, mounted in a cage arranged so as to be angularly shifted along a curved path.

In apparatuses of this type the sheet of glass enters horizontally between the rolls, and while these are pressing the glass, the mounting cage rotates horizontally about its own axis so as to lay the sheet of glass on a discharging conveyor.

It is necessary that the sheet of glass be fed to the pressing rolls at a properly set entry angle to prevent the sheet from being broken. To this end, manpower is provided to manually assist the sheet to enter at the proper angle, or else automatic centering devices are used.

In a cycle of manufacture of laminated safety glass, there are generally two pressing steps. The first step serves the purpose of expelling the air trapped between the layers, and the second step bonds the edges after subjecting the sheet of glass to light heating for softening the intermediate plastic layer.

The first of the two pressing steps is carried out in a horizontal position since the adherence between the glass and plastic layers is not yet sufficient.

In recent years, glass for automotive vehicles, particularly windscreens and rear windows, has become increasingly curved, and the wings, for aerodynamical and aesthetic reasons, are sharply bent in the direction of the concave surface of the glass window.

Consequently a horizontal pressing apparatus, such as previously described and known from the Italian Pat. No. 1142562, results in a high risk of breaking the glass, even when manpower is present. In fact, it can be easily understood that, when a sharply bent wing enters the pressing rolls, all the windscreen weight is discharged on the entry line, with the attendant risk of breaking the glass.

An automatic centering device does not avoid such a risk.

SUMMARY OF THE INVENTION

The object of the present invention is to eliminate the above mentioned drawbacks.

The present invention solves the problem of pressing, without the aid of manpower, a laminated sheet of glass having a very small radius, with wings sharply bent toward the inside of the glass, by providing an apparatus able to carry out pressing operations in the vertical direction, and able to carry out feeding and removing operations in the complete absence of manpower.

It has been in fact surprisingly found that, in contrast to what has been taken for granted so far in the prior art, the adhesion between the glass and the interposed plastic layer is sufficient to maintain the composite integral and avoid shifting of the single composing elements with respect to each other if the time in which it remains in a vertical position is very short. Consequently, vertical pressing can also be carried out in the first step expelling air from the composite, by means of an apparatus making the vertical standing time of the composite very short, and providing very swift entry of the sheet into the vertical pressing rolls.

Using an apparatus of this type, the following advantages are obtained: a reduction of the stresses involving the wings, regularity and uniformity of pressing by virtue of the smooth operation of the machine and pressing highly curved pieces with no use of manpower, thus obtaining a considerable decrease in the production cost.

The present invention thus is an apparatus for the pressing of laminated glass/plastic composites having a highly curved shape with side wings sharply bent in the direction of the concave surface of the composite, and is usable in an automatically operated plant for the manufacture of laminated safety glass. The apparatus includes a device for mechanically pressing the glass/plastic composite, and devices for the feeding into and the removing from the pressing device. The mechanical pressing device and the feeding and removing devices have axes of rotation perpendicular to the transport plane along which the glass/plastic composite is moved during treatment steps carried out prior to the pressing step.

BRIEF DESCRIPTION OF THE DRAWINGS

The invention will be described in greater detail in the following detailed description with reference to an embodiment illustrated in the drawings, in which.

DETAILED DESCRIPTION OF THE PREFERRED EMBODIMENT

Referring to FIGS. 1-8, a framework 1 supports a feeding carriage 3 and removing carriage 4. Vertical pressing rolls 2 are placed between the carriages.

Figure 1:
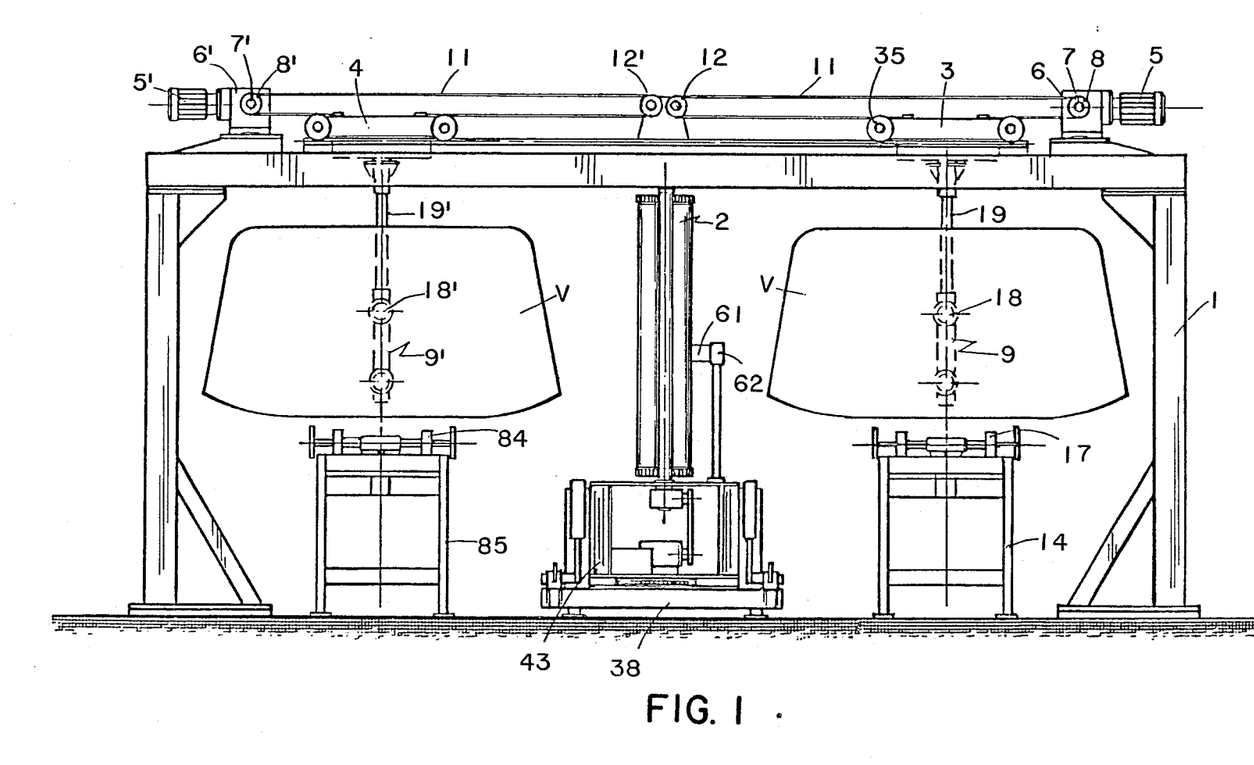
FIG. 1 represents a diagrammatic side view of a pressing machine according to the invention.

Motors 5 and 5′, through speed reducers 6 and 6′ and shafts 7 and 7′, transmit rotary motion to pulleys 8 and 8′ and thus to toothed belts 11 and 11′ connected to the carriages 3 and 4, respectively. Tension pulleys 12 and 12′ tension the belts 11 and 11′.

Figure 2:
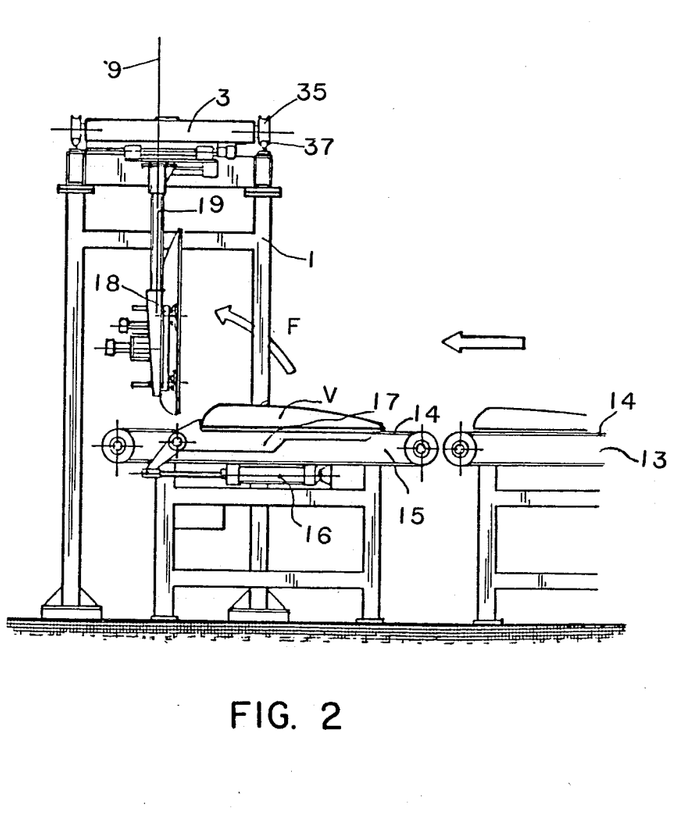
FIG. 2 is a diagrammatic side view of an automatic feeding device of the pressing machine.

As shown in FIG. 2, a conveyor 13 horizontally transports a sheet of glass V on conveying belts 14 to a conveyor 15, where the sheet V stops.

A pneumatic piston 16 placed under the conveying belts actuates a tipping device 17 which rotates in the direction of arrow F, placing the sheet V in a vertical position.

A suction cup unit 18 is connected to the carriage 3 through a shaft 19. This unit comprises suction sups 20 (FIG. 4) mounted on a support 21 on which two sliding shafts 22 and 22′ are welded opposite to the cups 20, the shafts being able to slide in supports 23 and 23′.

Figure 4:
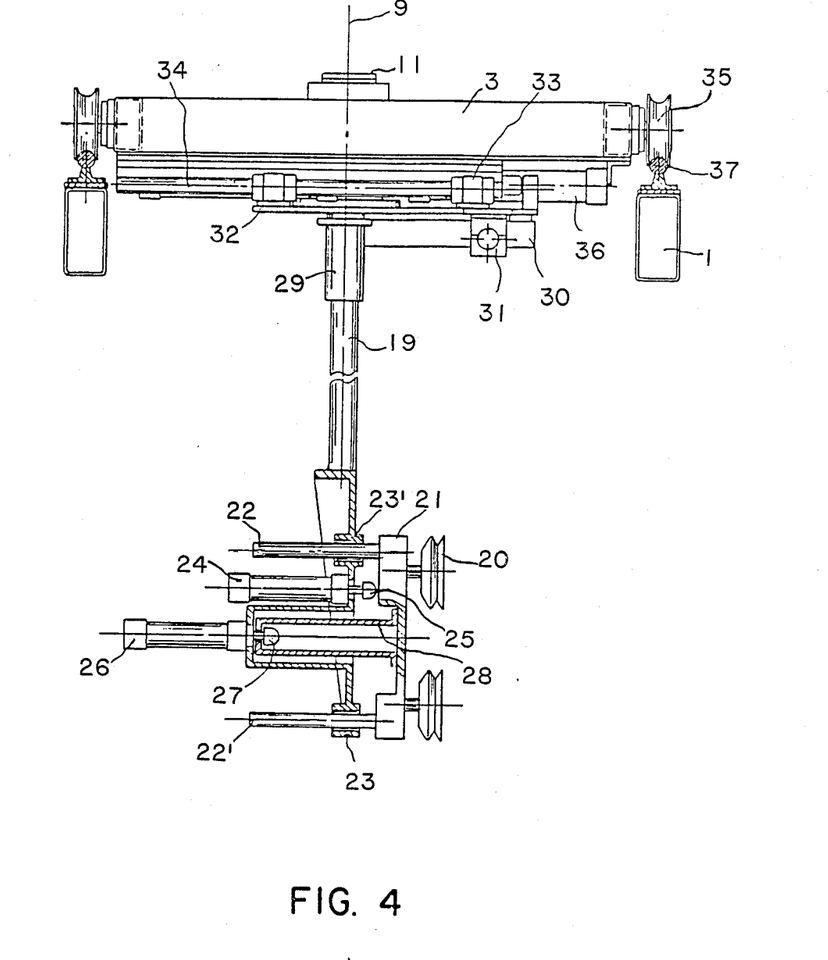
FIG. 4 is a diagrammatic side view of the automatic feeding or removing device.

A pneumatic piston 24, located behind the support 21, is provided with a rod 25 to move the support 21 towards the sheet of glass V. A pneumatic piston 26 has a rod 27 inserted into a sliding sleeve 28. The rod 27 causes the support 21 to move back after the sheet of glass V has been taken by the suction cups 20.

The shaft 19 is rotatably mounted on a movable platform 32 by means of a vertical pivot journal 29. A lever 30 for blocking rotation is connected to the shaft 19 and is controlled by a pneumatic piston 31 welded to the platform 32.

The suction cup unit 18 and the shaft 19 are able to move transversally to the direction of movement of carriage 3 as the platform 32, on which the shaft 19 is journalled, is provided with supports 33 capable of sliding on a guide 34.

A piston 36 is rigidly connected to the carriage 3 and controls the transverse movement of the platform 32.

The carriage 3 is able to run on rails 37 in a longitudinal direction, through wheels 35. Consequently, the suction cup unit 18 is able to move both in a transverse and a longitudinal direction and, moreover, it can revolve around an axis 9 of the shaft 19.

The above illustrated degrees of freedom of the suction cup unit 18 enable it to take the sheet of glass V from the tipping device 17 and bring it swiftly to the pressing rolls 2.

A microprocessor of a known type, which is not part of the present invention, controls the operational sequence.

The sheet V moves forward horizontally along the conveyor 13 and stops on the conveyor 15.

The tipping device 17 is raised to a vertical position, with the suction cup unit 18 already set to take the sheet V.

When the sheet V has been taken by the suction cups 20, the carriage 3 is moved transversely. At the same time, the shaft 19 rotates vertically around its axis 9 by an angle such that the sheet V is placed at a desired angle relative to the rolls 2.

The suction cup unit 18 is placed at the desired angle to the rolls 2 so that the entry of the sheet of glass V into the rolls is effected without risk of breaking the glass and as smoothly as possible.

Once the sheet V has been delivered to the rolls 2, the carriage 3 and the suction cup unit 18 are re-set to be in position for taking a successive sheet.

Figure 5:
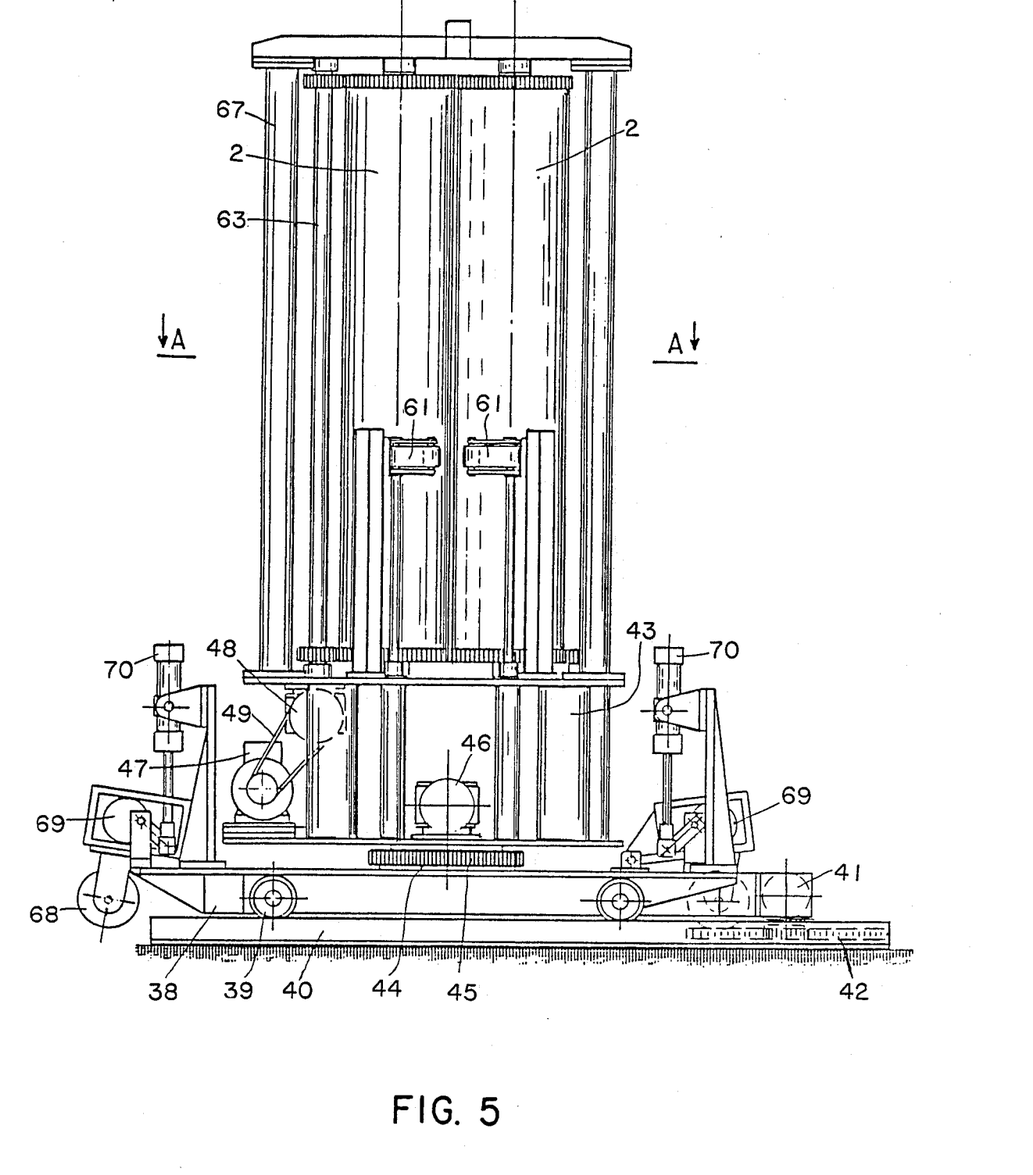
FIG. 5 is a diagrammatic side view of the pressing device according to the present invention.

The vertical pressing rolls 2 are supported by a frame 43 and a supporting structure 67 (FIG. 5). A second frame 38 is provided with wheels 39 running on rails 40, the frame 38 supporting the frame 43, and the frame 43 being able to rotate by 360° around its own axis on the frame 38.

A speed reducer 41 moves the frame 38 through a pinion gear (not shown in the figures) meshing with a rack 42.

The rotatable frame 43 rests on a rotatable center stand 44 connected to a speed reducer 46 through a gear 45 and a pinion gear not shown in the figure.

Figure 6:
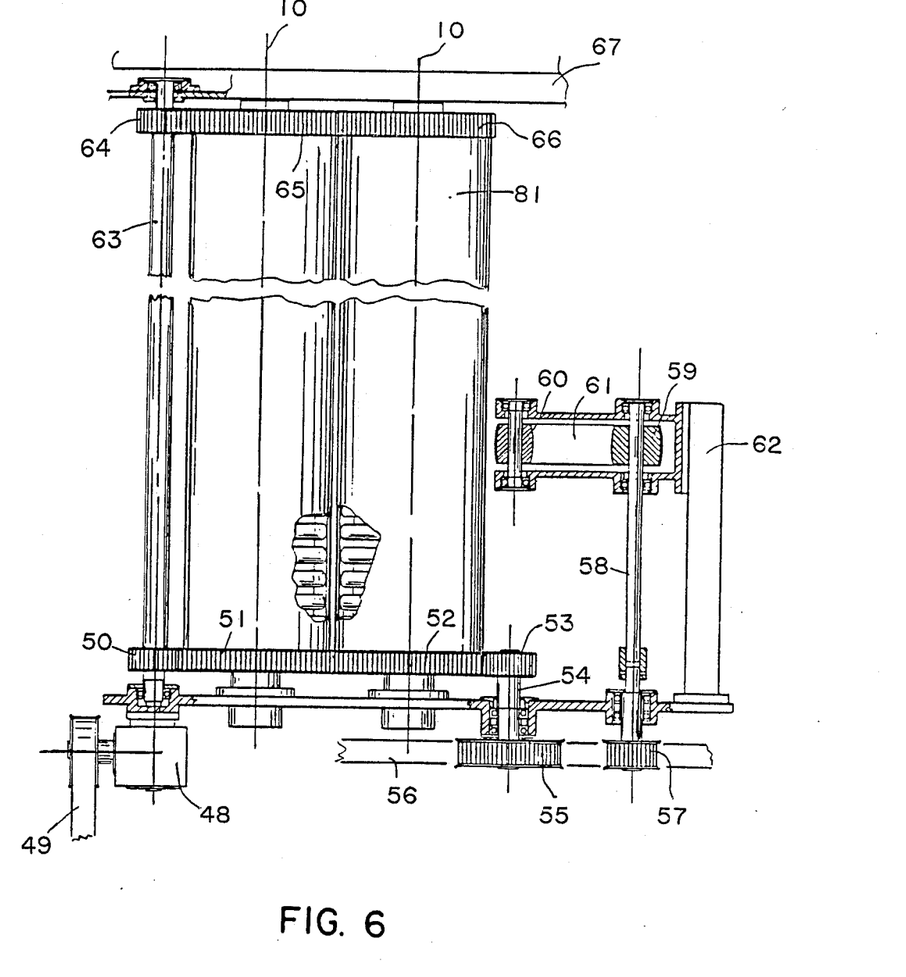
FIG. 6 is a diagrammatic side view of the mechanical linkage of the pressing device.

A toothed belt and gear system drives the rolls 2 in a rotational motion around their axes 10 (FIG. 6).

A motor 47 mounted on the frame 43 transmits a continuous rotational motion through a belt 49 to a speed reducer 48 connected to a gear 50.

Gears 51, 52 are rigidly mounted on the rolls 2. A gear 53, through a drive spindle 54, drives a toothed pulley 55 which, through a toothed belt 56, drives a toothed pulley 57.

The pulley 57, through a drive shaft 58, drives a belt 61 on pulleys 59 and 60. Pulleys 59 and 60 and the belt 61 are held by a fixed support 62 at a desired height.

A drive shaft 63 is connected at one end to the gear 50 and at the opposite end to a gear 64 meshing with gears 65 and 66. Gears 65 and 66 thus transmit motion to the rolls 2 at the same time as the gears 51 and 52.

The frame 38 supporting the entire pressing device is provided with a system for lifting the frame 38 off of the rails 40, in order to enable the whole assembly to be replaced.

To this end, pistons 70 push wheels 68 downwards by means of a cam 69, enabling the frame 38 to be lifted and the rails 40 to be removed from their seat.

Figure 3:
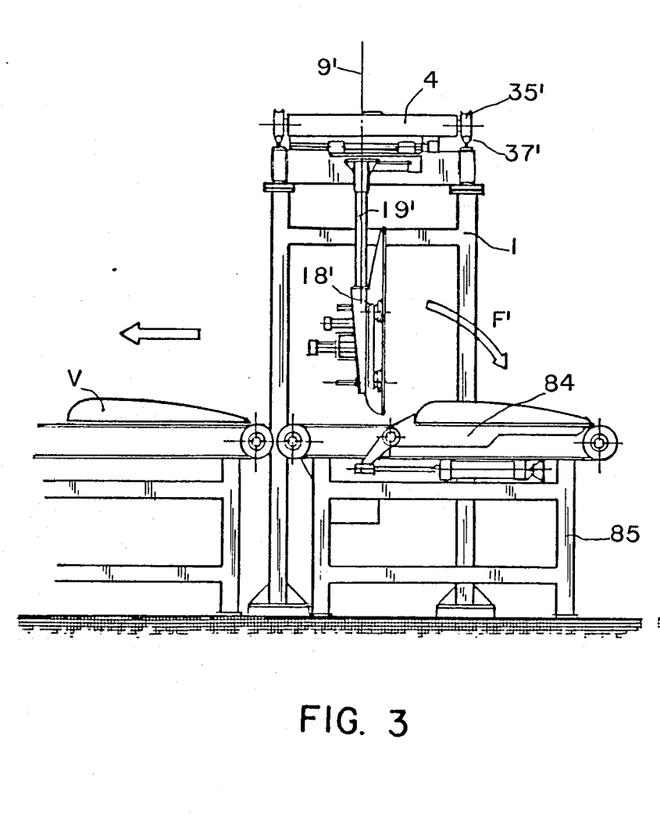
FIG. 3 is a diagrammatic side view of an automatic removing device of the pressing machine.

FIG. 3 illustrates the removing device for the pressing rolls 2, which is similar to the feeding device.

The carriage 4 can run on rails 37′ through wheels 35′.

A suction cup unit 18′ is supported by a shaft 19′ which can rotate around its own axis 9′. The carriage 4 moves the sheet of glass V transversely and lays it on a tipping device 84. The tipping device, which rotates in the direction of arrow F′, places the sheet V in a horizontal position on an output conveyor 85 which transfers the sheet to a successive working operation.

Figure 7:
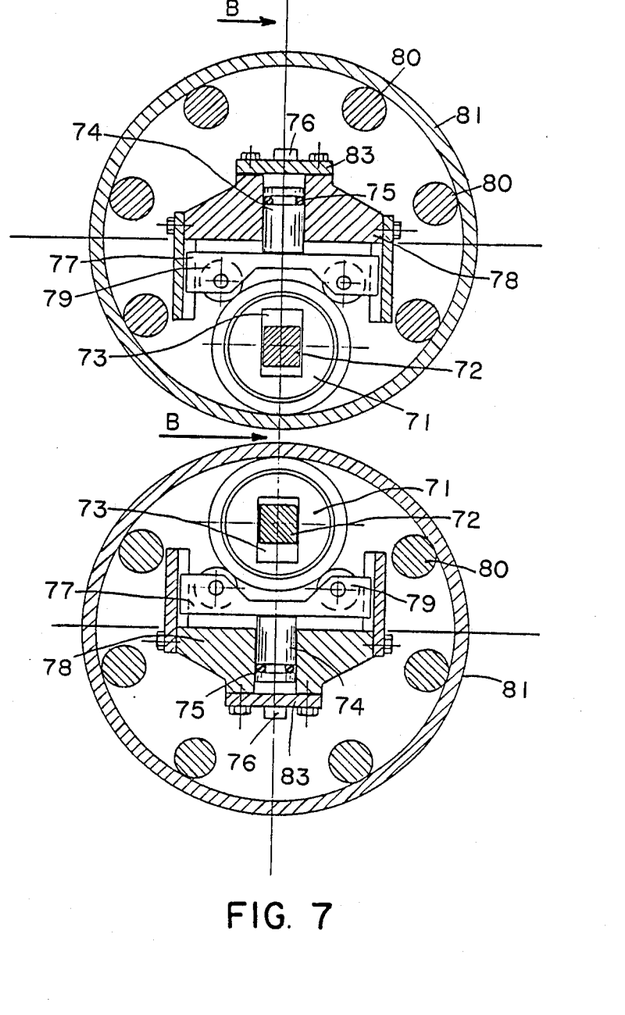
FIG. 7 is a cross sectional view along the line A—A of the pressing device of FIG. 5.
Figure 8:
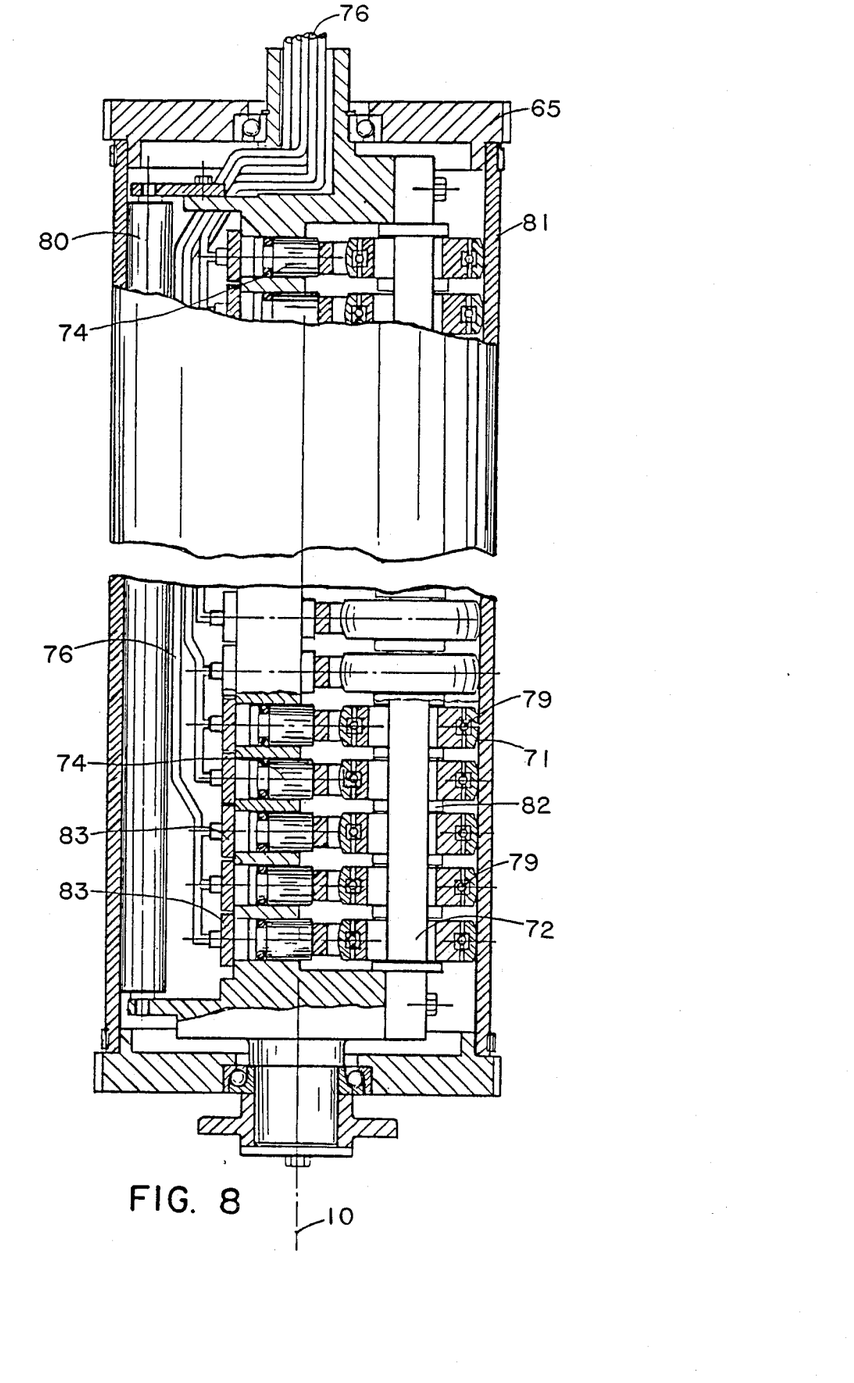
FIG. 8 is a cross sectional view along the line B—B of the pressing device of FIG. 7.

FIGS. 7 and 8 illustrate an embodiment of the pressing rolls 2.

The pressing rolls 2 have on the inside a plurality of pressing cushions 71 adjacent one another and spaced by supports 82, the cushions 71 being able to rotate around a square shaft 72.

The cushions 71 have a slot 73 enabling them to slide horizontally with respect to the square shaft 72. Shaft 72 is fixed and has a length such as to engage all of the pressing cushions 71.

Each pressing cushion 71 has an individual thrust system formed with a fixed support 78. A pneumatic piston 74 slides in each support 78. The piston 74 pushes a cage 77 to move rolls 79 to rest on the surface of the cushion 71. A cover 83 closes the cylinder of the fixed support 78 and a sealing ring 75 prevents outward seepage of compressed air.

Conduits 76 feed compressed air to the support 78.

On the inner surface of each of the rolls 2, where pressure is not directly applied, vertical longitudinal guide rolls 80 maintain under tension a tubular rubber element 81 covering the entire surface of each roll 2.

The plurality of pressing cushions 71, which are preferably fed compressed air in groups of three by conduits independent from each other, enables the pressure to be adjusted on each portion of a sheet of glass V to be pressed.

When the sheet of glass V comes near the rolls 2, the belts 61, having the same translational speed as the rolls 2, make it easier for the sheet of glass V to enter the rolls at the desired angle.

In the meantime, the amount of compressed air has been pre-set to provide the proper thrust on each group of pressing cushions 71.

As the rolls 2 can rotate by 360° about the axis of the rotatable frame 43, they also have been placed at a desired pressing angle. By virtue of their rotational motion, the rolls 2 transport the sheet V to the awaiting suction cup unit 18'.

Once pressing is completed, the carriage 4 takes the sheet V and lays it on the output tipping device 84.

According to the present invention, an automatic apparatus for rapidly pressing a laminated sheet of glass in a continuous line operation has been provided.

This has been obtained by means of the supply and output devices and the vertical pressing device, thus eliminating the risk of glass breaking and the need for manual handling.

Whereas the invention has been described in a particular preferred embodiment, it is intended that modifications and variations can be made within the scope of the invention.

We claim:

1. An apparatus for pressing a laminated glass/plastic composite having side wings sharply bent in a direction of concavity of said glass/plastic composite, comprising a press device rotatable about a substantially vertical axis for pressing said glass/plastic composite, means for moving said glass/plastic composite from a substantially horizontal delivery position to said press device, and means for moving said glass/plastic composite from said press device after said glass/plastic composite has been pressed, wherein:
   each said means for moving said glass/plastic composite includes a vertically disposed suction cup unit and a vertical supporting shaft supporting said suction cup unit;
   each said suction cup unit being rotatable about a vertical axis of said respective supporting shaft, whereby said glass/plastic composite can be moved to said press device to enter said press device in a substantially vertical position and at a predetermined entry angle, and moved from said press device in said substantially vertical position.

2. The apparatus as set forth in claim 1, wherein:
   said means for moving said glass/plastic composite from said press device further comprises means for tipping said glass/plastic composite from said substantially vertical position to a horizontal output position.

3. The apparatus as set forth in claim 1, wherein:
   said press device comprises a pair of substantially vertically disposed pressing rolls for pressing said glass/plastic composite therebetween, each said pressing roll including a plurality of pressing members vertically distributed along said pressing roll for imparting pressure to an area of said glass/plastic composite, each said pressing member receiving compressed air to press said pressing member toward said glass/plastic composite.

4. The apparatus as set forth in claim 3, wherein:
   each said plurality of pressing members is divided into a plurality of groups of three said pressing members, each said group of three pressing members receiving said compressed air form a separate compressed air conduit, whereby each said group of three pressing members can be provided with a distinct compressed air pressure to control the pressing force of said pressing members along said substantially vertically disposed pressing roll.

5. The apparatus as set forth in claim 3, wherein:
   said press device further includes guide means for guiding said glass/plastic composite into said press device between said pressing rolls at a predetermined entry angle.

6. The apparatus as set forth in claim 5, wherein:
   said guide means includes a pair of driven belts, each said belt mounted on a pair of pulleys, and each said pulley rotatably mounted on a fixed support adjacent said press device.

7. The apparatus as set forth in claim 1, further comprising:
   a movable carriage having said supporting shaft of said suction cup unit of said means for moving said glass/plastic composite form a substantially horizontal delivery position to said press device connected thereto, whereby said glass/plastic composite can be moved by said carriage, supporting shaft, and suction cup unit to said press device from a delivery location.

8. The apparatus as set forth in claim 1, further comprising:
   a movable carriage having said supporting shaft of said suction cup unit of said means for moving said glass plastic composite from said press device connected thereto, whereby said glass/plastic composite can be removed from said press device by movement of said carriage, supporting shaft, and suction cup unit.

9. The apparatus as set forth in claim 1, wherein:
   said means for moving said glass/plastic composite from a substantially horizontal delivery position to said press device includes means for tipping said glass/plastic composite from said horizontal delivery position to a vertical delivery position enabling said suction cup unit of said means for moving said glass/plastic composite from a substantially horizontal delivery position to said press device to contact said glass/plastic composite and move said glass/plastic composite to said press device.

10. An apparatus for pressing a laminated glass/plastic composite having side wings sharply bent in a direction of concavity of said glass/plastic composite, comprising a press device rotatable about a substantially vertical axis for pressing said glass/plastic composite, means for moving said glass/plastic composite from a substantially horizontal delivery position to said press device, and means for moving said glass/plastic composite form said press device after said glass/plastic composite has been pressed, wherein at least one of said means for moving said glass/plastic composite includes:

a holding unit for holding said glass/plastic composite; and means for movably supporting said holding unit such that said holding unit can move towards and away from said press device and such that said holding unit can rotate about a vertical axis.

11. The apparatus as set forth in claim 10, wherein:
said holding unit of said at least one of said means for moving said glass/plastic composite comprises a vertically disposed suction cup unit.

12. The apparatus as set forth in claim 10, wherein: said means for movably supporting said holding unit of said at least one of said means for moving said glass/plastic composite comprises a movable carriage having a rotatable vertical shaft connected thereto, said holding unit of said at least one of said means for moving said glass/plastic composite being connected to said rotatable vertical shaft.

13. The apparatus as set forth in claim 10, wherein:
at least one of said means for moving said glass/plastic composite includes means for tipping said glass/plastic composite between a horizontal position and a vertical position.

* * * * *